May 20, 1969  A. R. BONE  3,444,597

FILAMENT TYPE ATTACHMENT DEVICE AND MANUFACTURE OF SAME

Filed Dec. 12, 1966

Inventor
Arnold R. Bone
by Roberts, Cushman & Grover
Att'ys

United States Patent Office 3,444,597
Patented May 20, 1969

3,444,597
FILAMENT TYPE ATTACHMENT DEVICE AND MANUFACTURE OF SAME
Arnold R. Bone, Needham, Mass., assignor to Dennison Manufacturing Company, Framingham, Mass., a corporation of Nevada
Filed Dec 12, 1966, Ser. No. 601,002
Int. Cl. A44b 9/00; G09f 3/08
U.S. Cl. 24—150                                                8 Claims

ABSTRACT OF THE DISCLOSURE

An attachment device for securing tags and buttons to cloth comprising a unitary piece of thermoplastic material including a filament of tapering thickness, a head on one end of the filament and an enlargement on the other end, the filament being stretched to reduce its cross-sectional dimension and facilitate its passage through fabric and increase its strength by rearranging the molecules of the thermoplastic material.

---

This invention relates to devices for attaching articles together, such as a tag to merchandise or a button to a garment, and more particularly to devices comprising a filament, a head on one end of the filament and a cross-bar fast to the other end of the filament intermediate the ends of the cross-bar, all parts of the device comprising thermoplastic material and being integral. As disclosed in the copending application of Francis G. Merser, Ser. No. 512,350, filed Dec. 8, 1965, the filament should be small but strong and should be very flexible, especially adjacent the cross-bar. As disclosed in the patent to Bone 3,103,666 it has been proposed to mold the devices but it has not been possible to mold them with filaments fine enough or strong enough.

Objects of the present invention are to provide devices of the kind referred to which have filaments which are both fine and strong and which are very flexible adjacent the aforesaid cross-bar.

In one aspect the invention involves an attachment device comprising a filament, a head on one end of the filament and a cross-bar fast to the other end of the filament intermediate the ends of the cross-bar, all parts of the device comprising thermoplastic material and being integral, said filament being stretched to reduce its cross-sectional dimensions and increase its strength by rearranging the molecules of the thermoplastic material. The best materials found so far are nylon, polypropylene and polyethylene. In another aspect the invention involves the method of manufacture which comprises molding the device and then stretching said filament to reduce its cross-sectional dimensions and increasing its strength by rearranging the molecules of the thermoplastic material. The blank for making the aforesaid filament preferably has minimum diameter adjacent said cross-bar and maximum diameter adjacent said head and increased diameter toward said head throughout a portion of its length.

In a typical embodiment of the invention the dimensions of filament are as follows: before stretching, 1.0″ length, .035″ minimum diameter and .050″ maximum diameter; after stretching, 2.5″ length, .020″ minimum diameter and .050″ maximum diameter.

Figure 1:
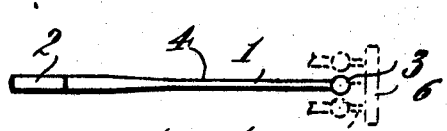
Figure 2:
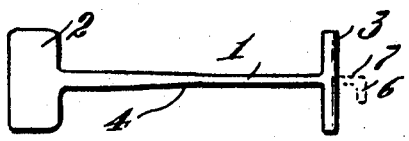
Figure 3:
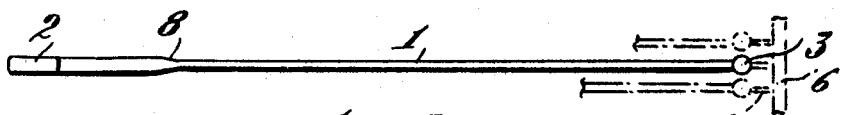
Figure 4:
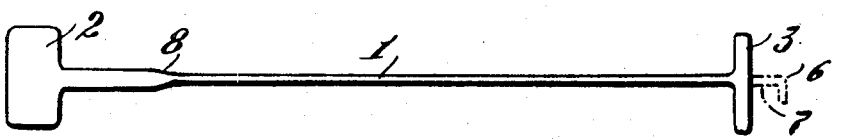

For the purpose of illustration typical embodiments of the invention are shown in the accompanying drawings in which FIGS. 1 and 2 are side views of the aforesaid blank; and FIGS. 3 and 4 are side views of a finished attachment device.

The blank shown in FIGS. 1 and 2 comprises a filament 1, a head 2 on one end of the filament, and a cross-bar 3 fast to the other end of the filament, all parts of the device comprising a single integral piece of nylon or other thermoplastic material in which the molecules are reoriented when the material is stretched thereby to strengthen the material. The filament 1 has minimum diameter adjacent the cross-bar and increased diameter toward the head from 4 approximately half its length. Preferably a plurality of the devices are molded together, the devices being connected by a rod 6 integrally joined to the cross-bars by necks 7. After the devices are molded the filaments are stretched to reduce their diameters as shown in FIGS. 3 and 4. Owing to variation in diameter of each filament, the portion of smallest diameter from 4 to the cross-bar 3 first stretches substantially to its elastic limit and then the stretching progresses from 4 toward the head 2. In the illustration the stretching is continued until it reaches point 8 adjacent the head. The stretching is preferably stopped before reaching the head to avoid the danger of breaking the filament. Also the difference in diameter ensures stretching up to the cross-bar 3 and serves as a buffer to take up variations in the stretching resulting from differences in diameter of the molded filaments from piece to piece, differences in temperature across the mold, etc. Without the enlarged buffer zone some filaments might break while correctly stretching adjacent filaments. This stretching not only reduces the diameter of the filament beyond the molding limit but, by reorienting the molecules of the thermoplastic material, it increases the tensile strength (p.s.i.) of the filament. While the devices may be severed from the necks 7 at any time after molding, preferably the devices are left interconnected in groups until they are used and are then severed successively as needed. The filaments may be stretched by hand or any suitable mechanism.

I claim:

1. An attachment device comprising a filament having relatively thick and thin end portions joined by an intermediate tapered portion, a head on the thicker end of the filament and a needle-like cross-bar fast to the thinner end of the filament and joined thereto intermediate the ends of the cross-bar, all parts of the device comprising stretch-orientable thermoplastic material and being integral with each other, said filament being adapted to be cold stretched to reduce its cross-sectional dimensions to a thread-like size capable of readily passing through cloth fabric and increase its strength by rearranging the molecules of the thermoplastic material, said filament after stretching having a portion of reduced cross-sectional dimensions in which the molecules have been rearranged to increase its strength, the dimensions of the filament being such that the filament stops stretching before reaching the head to avoid breaking of the filament, and the differences in diameter along the filament being such that when several attachment devices are simultaneously stretched these differences serve as buffers to take up any variations in the stretching of the several attachment devices resulting from slight differences in diameter of the filaments from attachment device to attachment device so that the several devices may be simulaneously stretched without breaking.

2. The method of making the device of claim 1 which comprises molding the device and then stretching the filament to reduce its cross-sectional dimensions and increasing is strength by rearranging the molecules of the thermoplastic material.

3. For making the device of claim 1, a blank formed from the material recited in claim 1 and dimensioned as recited in claim 1 in which said filament initially prior to stretching has minimum diameter adjacent said cross-bar and maximum diameter adjacent said head and gradually increases in diameter toward said head throughout a substantial portion of its length.

4. A blank according to claim 3 wherein the filament has initially prior to stretching said minimum diameter throughout approximately half its length and said increasing in diameter portion extends throughout approximately half its length.

5. For making an attachment device comprising a filament of thread-like size capable of readily passing through cloth fabric, a head on one end of the filament and a cross-bar fast to the other end of the filament intermediate the ends of the cross bar, all parts of the device comprising stretch-orientable thermoplastic material and being integral, the method which comprises molding the device with a filament having end portions of different cross-sectional dimensions joined by an intermediate portion of gradually tapered cross-sectional dimensions and then stretching said filament to reduce its cross-sectional dimensions to thread-like size and increasing its strength by rearranging the molecules of the thermoplastic material.

6. For use in the method of claim 5, a blank in which said filament has minimum diameter adjacent said cross-bar and maximum diameter adjacent said head and gradually increases in diameter toward said head throughout a portion of its length.

7. A blank according to claim 6 wherein the filament has said minimum diameter throughout approximately half its length and said portion extends throughout approximately half its length.

8. A device made according to claim 5.

References Cited

UNITED STATES PATENTS

| 2,817,221 | 12/1957 | Perham | 264—164 |
| 3,084,393 | 4/1963 | Rodenacker | 264—290 |

FOREIGN PATENTS

| 394,334 | 6/1933 | Great Britain. |
| 950,402 | 2/1964 | Great Britain. |

DONALD A. GRIFFIN, *Primary Examiner.*

U.S. Cl. X.R.

40—20

Disclaimer and Dedication 3,444,597.—*Arnold R. Bone*, Needham, Mass. FILAMENT TYPE ATTACHMENT DEVICE AND MANUFACTURE OF SAME. Patent dated May 20, 1969. Disclaimer and dedication filed Oct. 21, 1970, by the assignee, *Dennison Manufacturing Company*.

Hereby disclaims claims 1–8 of said patent and dedicates said patent to the Public.

[*Official Gazette March 2, 1971.*]